(12) United States Patent
Wang et al.

(10) Patent No.: US 11,861,505 B2
(45) Date of Patent: Jan. 2, 2024

(54) METHOD AND APPARATUS OF EXECUTING DYNAMIC GRAPH FOR NEURAL NETWORK COMPUTATION

(71) Applicant: ZHEJIANG LAB, Hangzhou (CN)

(72) Inventors: Hongsheng Wang, Hangzhou (CN); Hujun Bao, Hangzhou (CN); Guang Chen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/833,088

(22) Filed: Jun. 6, 2022

(65) Prior Publication Data

US 2023/0334334 A1    Oct. 19, 2023

Related U.S. Application Data

(63) Continuation of application No. PCT/CN2022/091352, filed on May 7, 2022.

(30) Foreign Application Priority Data

Apr. 13, 2022    (CN) .......................... 202210381726.9

(51) Int. Cl.
*G06N 3/10* (2006.01)
*G06N 7/01* (2023.01)
*G06N 3/04* (2023.01)

(52) U.S. Cl.
CPC ................. *G06N 3/10* (2013.01); *G06N 3/04* (2013.01); *G06N 7/01* (2023.01)

(58) Field of Classification Search
CPC ........ G06N 3/02–04; G06N 3/06; G06N 3/10; G06N 7/01
See application file for complete search history.

(56) References Cited

U.S. PATENT DOCUMENTS

2018/0204117 A1    7/2018  Brevdo
2019/0391796 A1*  12/2019  Brady ..................... G06F 8/458
(Continued)

FOREIGN PATENT DOCUMENTS

CN    105786465 A    7/2016
CN    105988856 A    10/2016
(Continued)

OTHER PUBLICATIONS

Chen et al., "TVM: An Automated End-to-End Optimizing Compiler for Deep learning", 2018, arXiv:1802.04799v3.*
(Continued)

*Primary Examiner* — Markus A. Vasquez
(74) *Attorney, Agent, or Firm* — IPro, PLLC (57) ABSTRACT

The disclosure discloses a method of executing dynamic graph for neural network computation and the apparatus thereof. The method of executing dynamic graph includes the following steps: S1: constructing and distributing an operator and a tensor; S2: deducing an operator executing process by an operator interpreter; S3: constructing an instruction of a virtual machine at runtime by the operator interpreter; S4: sending the instruction to the virtual machine at runtime by the operator interpreter; S5: scheduling the instruction by the virtual machine; and S6: releasing an executed instruction by the virtual machine. According to the method of executing dynamic graph for neural network computation and the apparatus thereof provided by the disclosure, runtime is abstracted to be the virtual machine, and the virtual machine acquires a sub-graph of each step constructed by a user in real time through the interpreter and schedules, the virtual machines issues, and executes each sub-graph.

10 Claims, 4 Drawing Sheets

(56) References Cited

U.S. PATENT DOCUMENTS

| | | | |
|---|---|---|---|
| 2019/0392296 A1* | 12/2019 | Brady | G06N 3/063 |
| 2020/0151580 A1 | 5/2020 | Horesh et al. | |
| 2020/0242189 A1* | 7/2020 | Chatterjee | G06F 9/44 |
| 2020/0319856 A1 | 10/2020 | Loria | |
| 2022/0051104 A1 | 2/2022 | Interlandi et al. | |

FOREIGN PATENT DOCUMENTS

| | | |
|---|---|---|
| CN | 110321999 A | 10/2019 |
| CN | 110637307 A | 12/2019 |
| CN | 111309757 A | 6/2020 |
| CN | 111338635 A | 6/2020 |
| CN | 111679911 A | 9/2020 |
| CN | 113065639 A | 7/2021 |
| CN | 113313241 A | 8/2021 |
| CN | 113434261 A | 9/2021 |
| CN | 114186687 A | 3/2022 |
| EP | 1672569 A1 | 6/2006 |
| IN | 114048030 A | 2/2022 |
| WO | 2021051772 A1 | 3/2021 |

OTHER PUBLICATIONS

Shen et al., "Nimble: Efficiently Compiling Dynamic Neural Networks for Model Inference", 2021, Proceedings of the 4th MLSys Conference.*

* cited by examiner

METHOD AND APPARATUS OF EXECUTING DYNAMIC GRAPH FOR NEURAL NETWORK COMPUTATION

CROSS-REFERENCE TO RELATED APPLICATION

The present disclosure claims the benefit of priority to Chinese Application No. 202210381726.9 filed on Apr. 13, 2022 to China National Intellectual Property Administration and entitled "Method and Apparatus of Executing Dynamic Graph for Neural Network Computation", of which is incorporated herein by reference in this disclosure in its entirety.

TECHNICAL FIELD

The disclosure relates to the field of a computer system based on a specific computing model, and particularly relates to a method of executing dynamic graph for neural network computation, and the apparatus thereof.

BACKGROUND

With the rapid development of industrial application of artificial intelligence, during the development of algorithm models by researchers and engineering users, a dynamic graph computing method for a deep neural network is still a hotspot problem explored by deep learning framework researchers at present. Most of existing graph computing technologies perform a computing task at runtime based on an entire static graph, thus it causes debugging and optimization to be carried out only after completely constructing an algorithm model, which has the disadvantages that, in the process of constructing the model by the researchers, it cannot meet the demand on instant verification of a partial sub-graph of the model, and not meet the demand on instant adjustment of a model structure either. In order to solve the difficult problem of carrying out just-in-time debugging on a dynamic graph for neural network computation, the present invention discloses a method of executing dynamic graph for neural network computation, and the apparatus thereof, and provides a method of executing dynamic graph for neural network computation in a deep learning training system and the apparatus thereof.

SUMMARY

The purpose of the disclosure is to provide a method of executing dynamic graph for neural network computation and the apparatus thereof so as to overcome the deficiencies in the prior art.

In order to achieve the above purpose, the disclosure provides technical solutions as follows.

The disclosure discloses a method of executing dynamic graph for neural network computation, including the following steps:
S1: constructing and distributing an operator and a tensor;
S2: deducing an operator executing process by an operator interpreter;
S3: constructing an instruction of a virtual machine at runtime by the operator interpreter, which includes the following sub-steps:
S31: constructing an instruction for reading and modifying a value of a tensor data pointer,
S32: constructing an instruction for running the operator,
S33: constructing an instruction for releasing a tensor memory of which the life cycle is ended, and
S34: constructing a dependency relationship between the instructions;
S4: sending the instruction of the virtual machine to the virtual machine at runtime by the operator interpreter;
S5: scheduling the instruction of the virtual machine by the virtual machine: when the virtual machine executes a current instruction, applying for a video memory for an output tensor, calling a kernel function of the operator on a current device to carry out computation, and writing a computation result into the output tensor, during a program running period, continuously carrying out polling by the virtual machine in a scheduler thread, if a new executable instruction exists, executing the new executable instruction, or else, continuing to carry out polling, which includes the following specific processes:
S51: initializing a preparation list, judging whether the current instruction can be issued, and if yes, adding the current instruction into the preparation list,
S52: receiving the preparation list by a temporary list, traversing the temporary list, and fetching each instruction, and
S53: issuing the instruction by the virtual machine; and
S6: releasing an executed instruction by the virtual machine.

Preferably, the step S1 includes the following specific sub-steps:
S11: creating an input tensor on a specified hardware device;
S12: constructing metainformation of an operator, the metainformation includes a name of the operator, names of the input and output tensors, and device information; and
S13: distributing the metainformation of the operator and the input tensor to the operator interpreter.

Preferably, the step S2 includes the following specific sub-steps:
S21: receiving a distributed operator object, the input and output tensors, and a context object by the operator interpreter, traversing a list of the input tensor, and adding a data pointer of a current input tensor into a pointer list of the data of the input tensor;
S22: deducing the metainformation of the operator, the metainformation includes device information and a type and a shape of the output tensor, the step includes the following specific sub-steps:
S221: declaring a pointer object of tensor data and an object which stores metainformation of the output tensor,
S222: traversing a list of the output tensor, applying for a tensor type pointer, initializing the tensor type pointer to be a tensor object, and updating a value of the object which stores the metainformation of the output tensor in the step S221 at a corresponding position to be metainformation of the tensor object, and
S223: deducing the device information, the shape, and the type of the operator; and
S23: constructing a kernel function of an operator for execution: constructing a kernel function of an operator for execution according to the operator object and the deduced device information.

Preferably, the step S223 includes the following specific sub-steps:
(i): deducing the device information of the operator: calling a device deducing function defined when the operator is registered, so as to acquire the deduced device information;

(ii): deducing shape and type information of the operator: calling shape deducing and type deducing functions defined when the operator is registered, so as to deduce the shape and the type of the operator at present; and (iii): traversing a data pointer of the output tensor and updating the data pointer of the output tensor based on the deduced metainformation of the output tensor.

Preferably, the step S3 is that the runtime of a deep learning operating system is abstracted to be the virtual machine, a minimum unit executed by the virtual machine is an instruction, and each type of instruction is bound with two attributes:

(1) a distributed description attribute, which represents a type of an executing device for execution at present; and (2) a type of a device stream, which represents a type of a hardware device for execution of the current instruction, wherein the device stream is an abstraction on a hardware device in the virtual machine, and each type of device stream corresponds to one type of hardware device.

Preferably, the step S34 includes the following specific sub-steps:

S341: defining an operand type of the instruction, wherein the operand type includes a constant type, a compile-time variable type, and a runtime variable type, the constant type corresponds to an input and represents a data reading operation, and the compile-time variable type and the runtime variable type correspond to an output and represent a data writing operation;

S342: consuming a readable data pointer object: traversing a constant type operand in a kernel function of a current operator, fetching a corresponding data pointer object of a current operand in an input tensor tuple, and executing a computing task by the kernel function of the current operator by utilizing a value of the obtained data pointer object;

S343: consuming a writable data pointer object, which includes the following specific processes:

(1) traversing a compile-time variable type operand in the current operator kernel function and fetching a corresponding data pointer object of a current operand in an output tensor tuple, (2) when the data pointer object of the output tensor corresponds to a plurality of instruction accesses, maintaining an instruction list for all instructions which access a data pointer object of a current output tensor, and adding the current instruction into the instruction list for the instructions which access the data pointer object, and (3) carrying out a lock on a plurality of read-write accesses of the data pointer: fetching an access object of a current data pointer by an instruction access pool according to an access type of the current data pointer, the instruction, and the data pointer object, adding the access object into an access list of the current instruction, updating the access list of the current instruction by utilizing the access object, adding the access object into an access list of a writing operation maintained by a current data pointer object, and updating the access list of the writing operation of the current data pointer by utilizing the above access object; and S344: constructing an edge of the instruction: analyzing a relationship between two instructions to respectively construct edges of the instructions and connecting the two instructions, wherein the relationship between the two instructions is a one-read one-write relationship, or a two-read relationship, or a two-write relationship.

Preferably, the step S53 includes the following specific steps:

S531: adding the instruction to a corresponding device stream, fetching a device stream of the current instruction according to the metainformation of the instruction, adding the current instruction into a runtime instruction list of a current device stream, and then adding the current device stream into an active device stream list;

S532: preparing the instruction by the device stream, fetching a type of the current device stream according to metainformation of the device stream, judging whether the type of the current device stream is located on a current scheduler thread, if yes, running the current instruction according to the type of the current device stream, otherwise, adding the current instruction into a preparation instruction list corresponding to the current device stream, and then running an instruction in the preparation instruction list on a separate thread;

S533: running the instruction by the device stream, receiving the current instruction by a computing function of the type of the device stream, setting a device ID according to a device ID of the device stream of the current instruction, calling a computing function of the instruction according to the metainformation of the instruction, and after the current instruction is executed, setting a state of the current instruction to be a "completed state"; and S534: pre-scheduling the instruction: when the preparation instruction list works each time, firstly, placing the preparation instruction list into a temporary list, continuously carrying out scheduling on the temporary list, after the temporary list receives the instruction in the preparation list, directly executing the instruction in the temporary list by the virtual machine, and at the same time, in the working process, once an instruction capable of being pre-scheduled is found, adding the instruction into the preparation list, such that the preparation instruction list can continue to receive the instruction sent to a virtual machine end by the interpreter.

Preferably, the step S533 of calling the computing function of the instruction according to the metainformation of the instruction includes the following specific processes:

(1) acquiring device context information;

(2) acquiring a current operand;

(3) according to the device context information and the operand, allocating a memory to the output tensor and allocating a memory to a temporary tensor;

(4) according to the device context information and the operand, initializing a state and a cache of the kernel function of the current operator; and (5) according to the device context information, the operand, and the state and the cache of the kernel function of the current operator, carrying out computation by the kernel function of the current operator.

Preferably, the step S6 includes the following specific processes:

S61: actively querying a state of the completed current instruction by the virtual machine: traversing a current active device stream list, calling a query interface of the type of the device stream to query the state of the current instruction, judging whether each instruction in a runtime instruction list of each device stream is in the "completed state", and if yes, releasing the current instruction; and S62: deleting the current instruction from the runtime instruction list of the current device stream.

The disclosure further discloses an apparatus of executing dynamic graph for neural network computation, including an interpreter and a virtual machine. The interpreter takes charge of: carrying out interaction of a user mode and an instruction mode, parsing a user code into an instruction, parsing metainformation of an operator by utilizing a deducing function of the metainformation when the operator is registered, specializing a kernel function of the operator into a kernel function on a specified device, and constructing an instruction of the virtual machine, and finally, sending a current instruction to the virtual machine; and the virtual machine takes charge of scheduling the instruction, receiving an instruction for calling the kernel function of the operator sent by the interpreter when a front-end user service code is executed, applying for a video memory for an output tensor when the instruction is executed, calling the kernel function of the operator on the device specified by the user to carry out computation, and writing a computation result into the output tensor.

Preferably, a main executing process of the apparatus includes: a process of parsing the instruction by the interpreter and a process of scheduling the instruction and issuing the instruction to a device stream to execute computation by the virtual machine.

The scheduling process of the virtual machine is as follows: during a program running period, the virtual machine continuously carries out polling in a scheduling thread, and if a new executable instruction exists, the new executable instruction is executed, otherwise, polling is continuously carried out; and a major cycle driver is designed on an outermost layer to drive a scheduler continuously, and in the major cycle, once a processed node is present, the processed node is deleted from a directed acyclic graph, and when a newly added front-end user service code is present, a new instruction node is added into the directed acyclic graph; and The polling process of the virtual machine is as follows: the virtual machine makes an iterative mode by a preparation instruction list and an adding instruction list, when the scheduler carries out polling, only the two lists need to be continuously processed, a dynamically processed instruction list that is ready for use is present in the directed acyclic graph, when the preparation instruction list works each time, firstly, the preparation instruction list is placed into a temporary list and scheduling is continuously carried out on the temporary list, and in the working process, once an instruction capable of being pre-scheduled is found, the instruction is added into the preparation list.

The disclosure further discloses an apparatus of executing dynamic graph for neural network computation, including a memory and one or more processors. An executable code is stored in the memory, and the one or more processors, when executing the executable code, are configured to implement the above method of executing dynamic graph for neural network computation.

The disclosure has the following beneficial effects: according to the method of executing dynamic graph for neural network computation and the apparatus thereof provided by the disclosure, the runtime is abstracted to be the virtual machine, and the interpreter acquires a sub-graph of each step constructed by the user, and the virtual machine schedules, issues, and executes each sub-graph in real time. It not only meets the demand of the user on just-in-time debugging, but also implements partial optimization, thereby obtaining an optimal partial model. In the process of developing an algorithm model by researchers and engineering users, the apparatus of executing dynamic graph for neural network computation is utilized to carry out just-in-time debugging, thereby meeting the demands on instant verification of algorithm correctness and partial performance of the model in the process of developing the model by an algorithm researcher.

DETAILED DESCRIPTION

In order to make purposes, technical solutions and advantages of the present invention more clear, the disclosure will be further illustrated in detail below in connection with the drawings and embodiments. However, it should be understood that the specific embodiments described herein are merely used for explaining the disclosure, but not intended to limit the scope of the disclosure. In addition, in the following illustration, description on well-known structures and arts is omitted so as to avoid unnecessary confusion of concepts of the present invention.

An embodiment of the disclosure designs an execution engine. The execution engine mainly involves a program running phase in a working process of an operating system, i.e., in the running process, the execution engine in the embodiment is named as a virtual machine.

Figure 1:
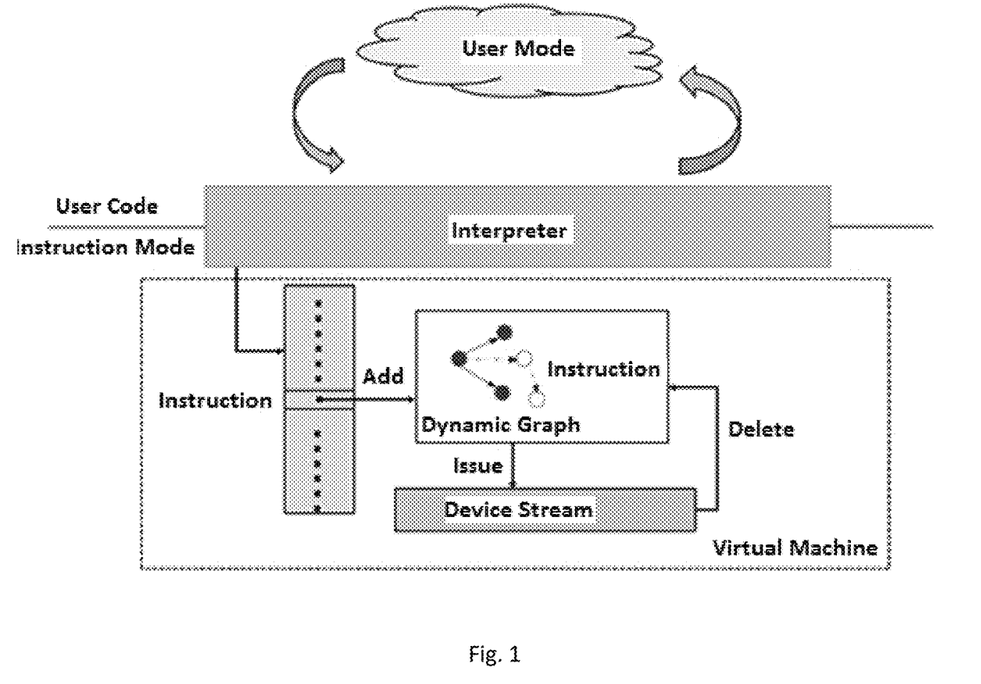
FIG. 1 is an architecture diagram of dynamic graph execution for neural network computation according to an embodiment of the disclosure.

As shown in FIG. 1, FIG. 1 is an architecture diagram of dynamic graph execution for neural network computation. An interpreter takes charge of carrying out interaction of a user mode and an instruction mode, and is configured to parse a user code into an instruction. A virtual machine takes charge of scheduling an instruction, and is configured to utilize the instruction to construct a dynamic directed acyclic graph consisting of instruction nodes. The process of scheduling the instruction by the virtual machine is actually a process of adding the instruction nodes to the dynamic directed acyclic graph, issuing the instruction nodes to a device stream to execute computation of a kernel function of an operator, and deleting the instruction node which has completed computation.

The embodiment provides a method of executing dynamic graph for neural network computation, including the following steps:

S1: constructing and distributing an operator and a tensor;

S2: deducing an operator executing process by an operator interpreter;

S3: constructing an instruction of a virtual machine at runtime by the operator interpreter;

S4: sending the instruction to the virtual machine at runtime by the operator interpreter;

S5: scheduling the instruction by the virtual machine; and

S6: releasing an executed instruction by the virtual machine.

The step S1 includes the following specific sub-steps:

S11: creating an input tensor on a specified hardware device;

S12: constructing metainformation of an operator, the metainformation includes a name of the operator, names of the input tensor and an output tensor, and device information; and S13: distributing the metainformation of the operator and the input tensor to the operator interpreter.

The step S2 includes the following specific sub-steps:

S21: receiving a distributed operator object, the input and output tensors, and a context object by the operator interpreter, traversing a list of the input tensor, and adding a data pointer of a current input tensor into a pointer list of the data of the input tensor;

S22: deducing the metainformation of the operator, the metainformation including the device information and a type and a shape of the output tensor, the step S22 includes the following specific sub-steps:

S221: declaring a pointer object of tensor data and an object which stores metainformation of the output tensor, S222: traversing a list of the output tensor, applying for a tensor type pointer, initializing the tensor type pointer to be a tensor object, and updating a value of the object which stores the metainformation of the output tensor in the step S221 at a corresponding position to be metainformation of the tensor object, and S223: deducing the device information, the shape, and the type of the operator, which includes the following specific sub-steps:

(i): deducing the device information of the operator: calling a device deducing function defined when the operator is registered, so as to acquire the deduced device information, (ii): deducing shape and type information of the operator: calling shape deducing and type deducing functions defined when the operator is registered, so as to deduce the shape and the type of the operator at present, and (iii): traversing a data pointer of the output tensor and updating the data pointer of the output tensor based on the deduced metainformation of the output tensor; and S23: constructing a kernel function of an operator for execution: constructing a kernel function of an operator for execution according to the operator object and the deduced device information.

The step S3 is that the runtime of a deep learning operating system is abstracted to be the virtual machine. A minimum unit executed by the virtual machine is an instruction, and each type of instruction is bound with two attributes: one is a distributive description attribute which represents devices on which a current instruction is executed; and the other one is a type of a device stream, which represents a type of a hardware device on which the current instruction is executed, and if the hardware device is a GPU, the type of the hardware device stream is CudaStream. The device stream is an abstraction on the hardware device in the virtual machine, and each type of device stream corresponds to one type of hardware device. The process of constructing the instruction of the virtual machine at runtime by the operator interpreter includes the following steps:

S31: constructing an instruction for reading and modifying a value of a tensor data pointer;

S32: constructing an instruction for running an operator;

S33: constructing an instruction for releasing a tensor memory of which the life cycle is ended; and S34: constructing a dependency relationship between the instructions, which includes the following specific sub-steps:

S341: defining operand types of the instructions, and constructing the dependency relationship between the instructions by the operand types of the instructions, wherein the main operand types include const, mut, and mut2; const is a constant type, mut is a compile-time variable type, and mut2 is a runtime variable type; const corresponds to an input and represents a data reading operation; mut and mut2 correspond to an output and represent a data writing operation; a user issues two instructions a and b, then the instruction a requests to modify a value of an operand c, but the instruction b requests to read the value of the operand c, and then the instruction a has to be executed prior to the instruction b; the instruction a has an operand c with a mut type, and the instruction b has an operand c with a const type; by checking the type of the operands in the instructions a and b, the dependency relationship can be established between the instructions a and b: deduction of the instruction b needs to be carried out after deduction of the instruction a, and computation of the instruction b needs to be carried out after computation of the instruction a; the operand type mut2 is to process some operators of which the shapes of the output tensors need to be determined at runtime, and if the instruction a possesses the operand c in a form of the operand type nut2, both deduction and computation of the instruction b need to be carried out after computation of the instruction a;

S342: consuming a readable data pointer object: traversing const operands in a kernel function of the current operator, fetching a corresponding data pointer object of a current operand in an input tensor tuple, and executing a computing task by the kernel function of the current operator by utilizing a value of the obtained data pointer object;

S343: consuming a writable data pointer object, which includes the following specific processes:

(1) traversing mut operands in the kernel function of the current operator and fetching a corresponding data pointer object of a current operand in an output tensor tuple;

(2) when the data pointer object of the output tensor corresponds to a plurality of instruction accesses, maintaining an instruction list for all instructions which access the data pointer object of a current output tensor, and adding the current instruction into the instruction list for the instructions which access the data pointer object; and (3) carrying out a lock on a plurality of read-write accesses of the data pointer: fetching an access object of a current data pointer by an instruction access pool according to an access type of the current data pointer, the instruction, and the data pointer object, adding the access object into an access list of the current instruction, i.e., updating the access list of the current instruction by utilizing the access object, and adding the access object of the instruction into an access list of a writing operation maintained by a current data pointer object, i.e., updating the access list of the writing operation of the current data pointer by utilizing the access object of the instruction, in other words, writing data into the current data pointer; and S344: constructing an edge of the instruction: analyzing a relationship between two instructions, for example, a one-read one-write relationship, or a two-read relationship, or a two-write relationship, to respectively construct edges of the instructions and connecting the two instructions.

The step S5 of scheduling the instruction by the virtual machine is as follows: when executing the current instruction, the virtual machine at runtime applies for a video memory for the output tensor, calls a kernel function of the operator on a current device to carry out computation, and writes a computation result into the output tensor. During a program running period, the virtual machine may continuously carry out polling in a scheduler thread, executes the new executable instruction if a new executable instruction exists, otherwise continues to carry out polling. Scheduling the instruction by the virtual machine includes the following process:

S51: initializing a preparation list, judging whether the current instruction can be issued, and if yes, adding the current instruction into the preparation list;

S52: receiving the preparation list by a temporary list, traversing the temporary list, and fetching each instruction; and S53: issuing the instruction by the virtual machine.

The step S53 includes the following process:

S531: adding the instruction to a corresponding device stream, which includes the following specific steps:
(i) fetching a device stream of the current instruction according to the metainformation of the instruction,
(ii) adding the current instruction into a runtime instruction list of a current device stream, and
(iii) adding the current device stream into an active device stream list;

S532: preparing the instruction by the device stream, which includes the following specific steps:
(i) fetching a type of a current device stream according to metainformation of the device stream, and
(ii) judging whether the type of the current device stream is located on a current scheduler thread, if yes, running the current instruction according to the type of the current device stream, otherwise, adding the current instruction into a preparation instruction list corresponding to the current device stream, and then running an instruction in the preparation list on a separate thread;

S533: running the instruction by the device stream, which includes the following specific steps:
(i) receiving the current instruction by a computing function of the type of the device stream,
(ii) setting a device ID according to a device ID of the device stream of the current instruction,
(iii) calling a computing function of the instruction according to the metainformation of the instruction, wherein:
the computing process of the instruction includes the following steps:
(1) acquiring device context information,
(2) acquiring a current operand,
(3) according to the device context information and the operand, allocating a memory to the output tensor and allocating a memory to a temporary tensor,
(4) according to the device context information and the operand, initializing a state and a cache of the kernel function of the current operator, and
(5) according to the device context information, the operand, and the state and the cache of the kernel function of the current operator, carrying out computation by the kernel function of the current operator; and
(iv) after the current instruction is executed, setting a state of the current instruction to be a "completed state"; and S534: pre-scheduling the instruction: when the preparation instruction list works each time, firstly, placing the preparation instruction list into a temporary list, continuously carrying out scheduling on the temporary list, after the temporary list receives the instruction in the preparation list, directly executing the instruction in the temporary list by the virtual machine, and at the same time, in the working process, once an instruction capable of being pre-scheduled is found, adding the instruction into the preparation instruction list, such that the preparation instruction list can continue to receive the instruction sent to a virtual machine end by the interpreter.

The step S6 includes the following specific processes:

S61: actively querying a state of the completed current instruction by the virtual machine: traversing a current active device stream list, calling a query interface of the type of the device stream to query the state of the current instruction, judging whether each instruction in the runtime instruction list of each device stream is in the "completed state", and if yes, releasing the current instruction; and S62: deleting the current instruction from the runtime instruction list of the current device stream.

The embodiment further discloses an apparatus of executing dynamic graph for neural network model computation in a deep learning training system. The apparatus includes an interpreter and a virtual machine. The apparatus mainly executes the following two processes: a process of parsing an instruction by the interpreter and a process of scheduling the instruction and issuing the instruction to a device stream to execute computation by the virtual machine.

The process of parsing an instruction by the interpreter includes: deducing metainformation of an operator by utilizing a deducing function of the metainformation when the operator is registered through the interpreter, and specializing a kernel function of the operator into a kernel function on a specified device, and constructing an instruction of the virtual machine. Finally, the interpreter takes charge of sending a current instruction to the virtual machine.

The defined virtual machine is as follows: the runtime is abstracted to be the virtual machine. When a Python service code is executed, the interpreter sends an instruction for calling the kernel function of the operator to the virtual machine. When executing the instruction, the virtual machine may apply for a video memory for an output tensor, the kernel function of the operator on the specified device is called to carry out computation, and a computation result is written into the output tensor. The specified device is decided by the use setting of a user, most commonly, a NVIDIA GPU device. The virtual machine has the most important responsibility of scheduling, and does not perform the specific work per se, and the specific work is done by a specific instruction of the operator. The virtual machine constructs a big directed acyclic graph from a Python service sequence, and the virtual machine has the main responsibility of constructing a dynamic directed acyclic graph. The process of scheduling the instruction by the virtual machine is actually a process of carrying out addition and deletion of nodes on the dynamic directed acyclic graph. The addition of nodes refers to continuous addition of instruction nodes to the dynamic directed acyclic graph. The deletion of nodes refers to deletion of the instruction nodes that are completed.

The scheduling process of the virtual machine is as follows: during a program running period, the virtual machine continuously carries out polling in a scheduling thread, if a new executable instruction exists, the new executable instruction is executed, otherwise polling is continuously carried out; a major cycle driver is designed on an outermost layer to drive a scheduler continuously; in the major cycle, once a processed node is present, the processed node is deleted from the directed acyclic graph; and when a newly added Python service code is present, a new instruction node is added into the directed acyclic graph.

The specific polling process of the virtual machine is as follows: the virtual machine makes an iterative mode by a preparation instruction list and an adding instruction list, and when the scheduler carries out polling, only the two lists need to be continuously processed; a dynamically processed instruction list that is ready for use is present in the directed acyclic graph; when the preparation instruction list works each time, firstly, the preparation instruction list is placed into a temporary list, and scheduling is continuously carried out on the temporary list; and in the working process, once an instruction capable of being pre-scheduled is found, the instruction is added into the preparation list.

Figure 2:
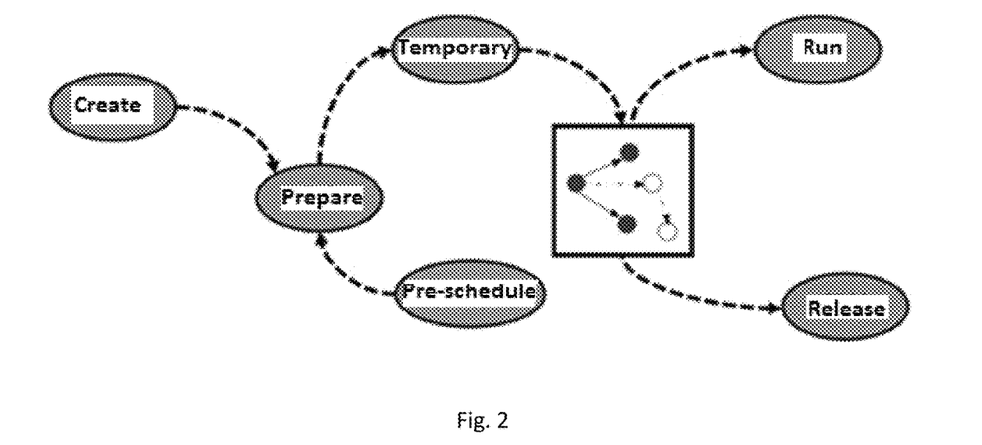
FIG. 2 is a schematic diagram of instructions flowing in a scheduling process of a virtual machine according to an embodiment of the disclosure.

Through the above steps, the whole process of the implementation of dynamic graph execution for neural network model computation is completed, and FIG. 2 shows an instruction flowing process in a virtual machine scheduling phase. The dynamic graph executing process of ResNet-50 model computation is shown below by utilizing a NVIDIA Nsight Systems tool. An executing result includes runtime information:

D represents that the virtual machine issues an instruction;
S represents that the virtual machine issues the instruction to a device stream;
P represents that the virtual machine pre-schedules a prepared instruction; and
R represents an operation of releasing an executed instruction.

The process of the partial schematic diagram of the shown dynamic graph executing process for the ResNet-50 model computation is as follows: firstly, the virtual machine issues an instruction of a normalization operator; at the moment, an instruction of a conv2d operator is prepared, and the virtual machine pre-schedules one instruction of the conv2d operator; once an input of the normalization operator is used up, an input memory of the normalization operator may start to be released; and then the virtual machine starts to pre-schedule the memory in which the completed instruction of the normalization operator is released.

Figure 3:
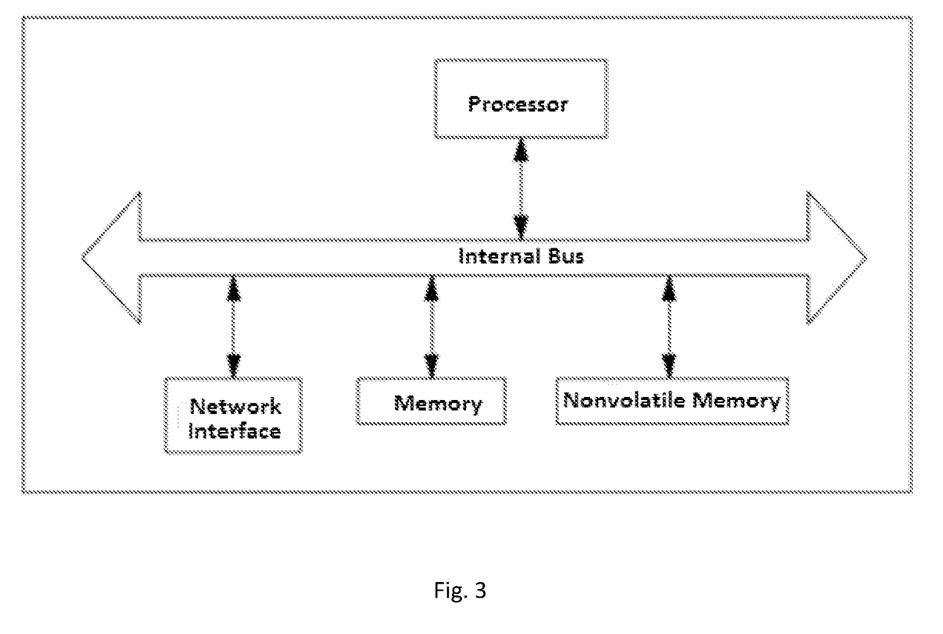
FIG. 3 is a schematic diagram of an apparatus of executing dynamic graph for neural network computation according to an embodiment of the disclosure.
Figure 4:
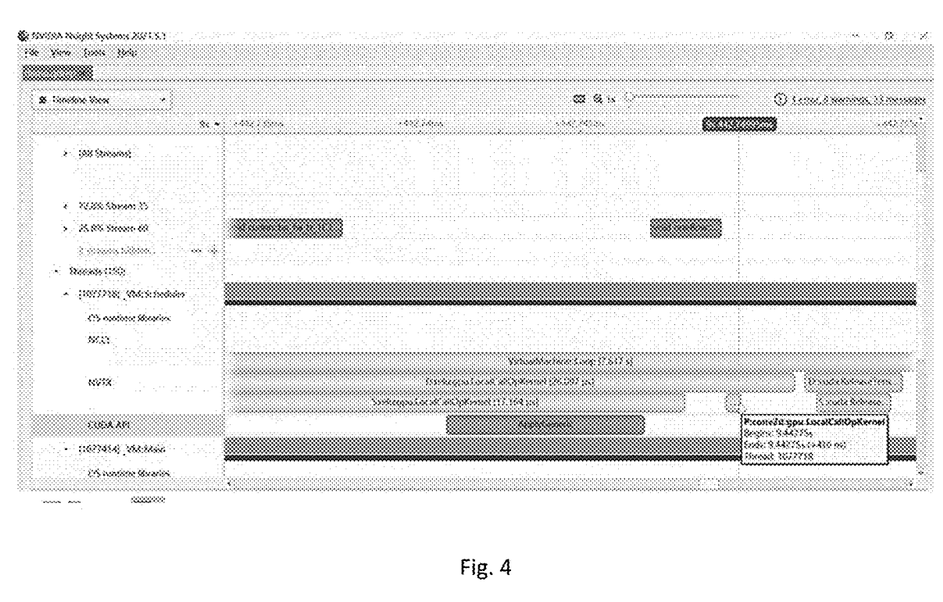
Figure 5:
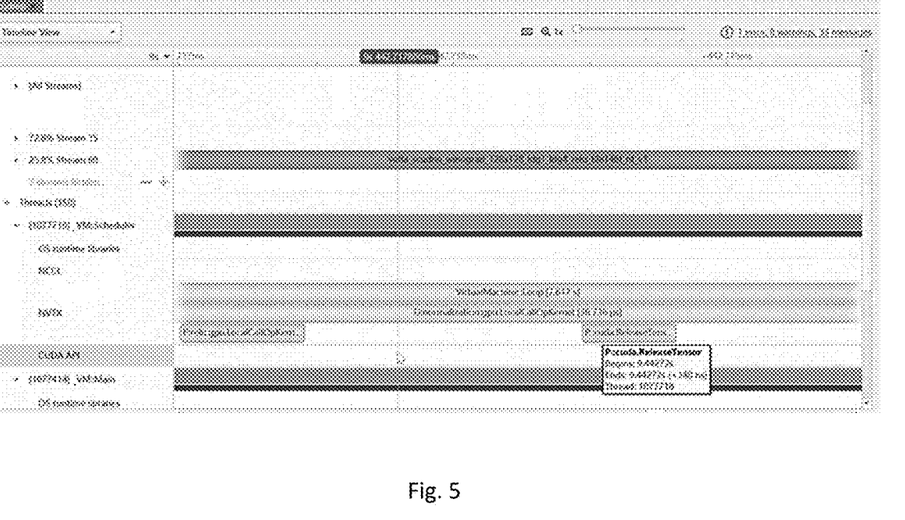
Figure 6:
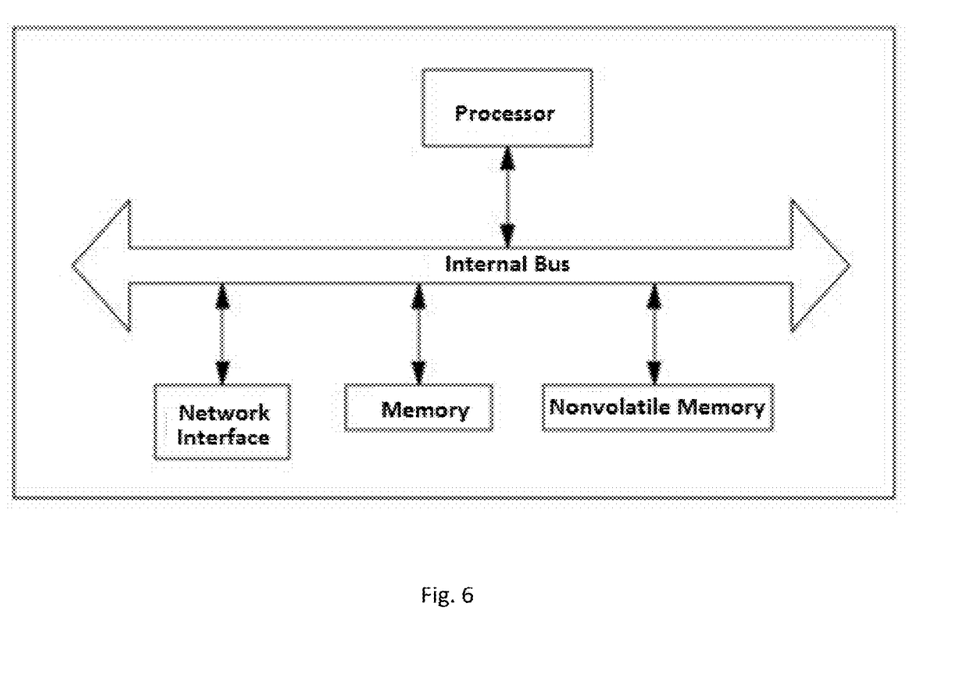

With reference to FIG. 3, an embodiment of the disclosure further provides a dynamic graph executing apparatus for neural network computation, including a memory and one or more processors. An executable code is stored in the memory, and, the one or more processors, when executing the executable code, are configured to implement the method of executing dynamic graph for neural network computation in the above embodiment.

The apparatus of executing dynamic graph for neural network computation in the embodiment of the present invention can be applied in any device with the data processing ability, and the any device with the data processing ability may be a device or an apparatus such as a computer. The apparatus embodiment may be implemented by software, or may be implemented by hardware or in a software and hardware combined mode. By taking software implementation as an example, an apparatus in the logical sense is formed by reading a corresponding computer program instruction in a nonvolatile memory into a memory and running by a processor of any device with the data processing ability where the apparatus is located. From the hardware level, as shown in FIG. 3, FIG. 3 is a hardware structure diagram of any device with the data processing ability where the apparatus of executing dynamic graph for neural network computation of the invention is located, and besides a processor, a memory, a network interface, and a nonvolatile memory as shown in FIG. 3, the any device with the data processing ability where the apparatus in the embodiment is located generally may further include other hardware according actual functions of the any device with the data processing ability, which is not described in detail herein. The implementing process of the function and the effect of each unit in the apparatus may refer to the implementing process of the corresponding steps in the method in detail, which is not described in detail herein.

Since the apparatus embodiment basically corresponds to the method embodiment, so that the related parts may refer to the description of the part in the method embodiment. The above-described apparatus embodiment is merely schematic, wherein the units illustrated as separate parts may be, or may be not separated physically, and parts displayed as units may be or may not be physical units, i.e., may be located at one place or may be distributed onto a plurality of network units. Part or all of modules may be selected according to actual demands to achieve the purposes of the solutions of the present invention. Those of ordinary skill in the art can understand and implement the solutions without any inventive work.

An embodiment of the disclosure further provides a computer readable storage medium which stores a program. The program, when being executed by a processor, implements the method of executing dynamic graph for neural network computation in the above embodiment.

The computer readable storage medium may be an internal storage unit of any device with the data processing ability according to any of the above embodiments, e.g., a hard disk or a memory. The computer readable storage medium may also be an external storage device of any device with the data processing ability, e.g., a plug-in type hard disk, a Smart Media Card (SMC), an SD card, a Flash card, and the like equipped on the device. Further, the computer readable storage medium further may not only include an internal storage unit, but also include an external storage device of the any device with the data processing ability. The computer readable storage medium is used for storing the computer program and other programs and data required by the any device with the data processing ability, and also may be used for temporarily storing data which has been output or is to be output.

The above description is merely preferred embodiments of the present disclosure, and is not intended to limit the disclosure, and the scope of the disclosure is determined by the appended claims. Any modifications, equivalent replacements or improvements, and the like made within the spirit and the principle of the disclosure shall fall within the scope of protection of the disclosure.

What is claimed is:
1. A method of executing dynamic graph for neural network computation, comprising the following steps:
S1: constructing and distributing an operator and a tensor;
S2: deducing an operator executing process by an operator interpreter;

S3: constructing an instruction of a virtual machine at runtime by the operator interpreter, which comprises the following sub-steps:
S31: constructing an instruction for reading and modifying a value of a tensor data pointer,
S32: constructing an instruction for running the operator,
S33: constructing an instruction for releasing a tensor memory, and
S34: constructing a dependency relationship between the instruction for reading and modifying the value of the tensor data pointer, the instruction for running the operator and the instruction for releasing the tensor memory;
S4: sending, to the virtual machine at runtime by the operator interpreter, the instruction of the virtual machine;
S5: scheduling, by the virtual machine, the instruction of the virtual machine; wherein the scheduling comprises: applying for a video memory for an output tensor when the virtual machine executes a current instruction, calling a kernel function of the operator on a current device to carry out computation, and writing a computation result into the output tensor; during a program running period, continuously carrying out polling by the virtual machine in a scheduler thread; in response to a new executable instruction being present, executing the new executable instruction, otherwise continuing to carrying out polling, wherein the polling comprises:
S51: initializing a preparation list, judging whether a current instruction can be issued, and in response to that the current instruction can be issued, adding the current instruction into the preparation list,
S52: receiving the preparation list by a temporary list, traversing the temporary list, and fetching each instruction in the temporary list, and
S53: issuing the each instruction in the temporary list by the virtual machine; and
S6: releasing a new instruction by the virtual machine.

2. The method of executing dynamic graph for neural network computation according to claim 1, wherein the step S1 includes the following specific sub-steps:
S11: creating an input tensor on a specified hardware device;
S12: constructing metainformation of an operator, the metainformation includes a name of the operator, names of the input and output tensors, and device information; and
S13: distributing the metainformation of the operator and the input tensor to the operator interpreter.

3. The method of executing dynamic graph for neural network computation according to claim 1, wherein the step S2 includes the following specific sub-steps:
S21: receiving a distributed operator object, the input and output tensors, and a context object by the operator interpreter, traversing a list of the input tensor, and adding a data pointer of a current input tensor into a pointer list of the data of the input tensor;
S22: deducing metainformation of the operator, the metainformation including device information and a type and a shape of the output tensor, which includes the following specific sub-steps:
S221: declaring a pointer object of tensor data and an object which stores metainformation of the output tensor,
S222: traversing a list of the output tensor, applying for a tensor type pointer, initializing the tensor type pointer to be a tensor object, and updating a value of the object which stores the metainformation of the output tensor in the step S221 at a corresponding position to be metainformation of the tensor object, and
S223: deducing the device information, the shape, and the type of the operator; and
S23: constructing a kernel function of an operator for execution: constructing a kernel function of an operator for execution according to the operator object and the deduced device information.

4. The method of executing dynamic graph for neural network computation according to claim 3, wherein the step S223 includes the following specific sub-steps:
(i): deducing the device information of the operator: calling a device deducing function defined when the operator is registered, so as to acquire the deduced device information;
(ii): deducing shape and type information of the operator: calling shape deducing and type deducing functions defined when the operator is registered, so as to deduce the shape and the type of the operator at present; and
(iii): traversing a data pointer of the output tensor and updating the data pointer of the output tensor based on the deduced metainformation of the output tensor.

5. The method of executing dynamic graph for neural network computation according to claim 1, wherein the step S3 is that the runtime of a deep learning operating system is abstracted to be the virtual machine, a minimum unit executed by the virtual machine is an instruction, and each type of instruction is bound with two attributes:
(1) a distributed description attribute, which represents a type of an executing device for execution at present; and
(2) a type of a device stream, which represents a type of a hardware device for execution of the current instruction, wherein the device stream is an abstraction on a hardware device in the virtual machine, and each type of device stream corresponds to one type of hardware device.

6. The method of executing dynamic graph for neural network computation according to claim 1, wherein the step S34 includes the following specific sub-steps:
S341: defining an operand type of each of the instruction for reading and modifying the value of the tensor data pointer, the instruction for running the operator and the instruction for releasing the tensor memory, wherein the operand type comprises a constant type, a compile-time variable type, and a runtime variable type, the constant type corresponds to an input and represents a data reading operation, and the compile-time variable type and the runtime variable type correspond to an output and represent a data writing operation;
S342: consuming a readable data pointer object: traversing a constant type operand in a kernel function of a current operator, fetching a corresponding data pointer object of a current operand in an input tensor tuple, and executing a computing task by the kernel function of the current operator by utilizing a value of the obtained data pointer object;
S343: consuming a writable data pointer object, which includes the following specific processes:
(1) traversing a compile-time variable type operand in the kernel function of the current operator and fetching a corresponding data pointer object of a current operand in an output tensor tuple,
(2) when the data pointer object of the output tensor corresponds to a plurality of instruction accesses, maintaining an instruction list for all instructions which access a data pointer object of a current output tensor, and adding the current instruction into the instruction list for the instructions which access the data pointer object, and (3) carrying out a lock on a plurality of read-write accesses of the data pointer: fetching an access object of a current data pointer by an instruction access pool according to an access type of the current data pointer, the instruction, and the data pointer object, adding the access object into an access list of the current instruction, updating the access list of the current instruction by utilizing the access object, adding the access object into an access list of a writing operation maintained by a current data pointer object, and updating the access list of the writing operation of the current data pointer by utilizing the access object, and S344: constructing an edge of the instruction: analyzing a relationship between two instructions to respectively construct edges of the instructions, and connecting the two instructions, wherein the relationship between the two instructions is a one-read one-write relationship, or a two-read relationship, or a two-write relationship.

7. The method of executing dynamic graph for neural network computation according to claim 1, wherein the step S53 includes the following specific steps:

S531: adding the each instruction in the temporary list to a corresponding device stream, fetching a device stream of the current instruction according to metainformation of the each instruction in the temporary list, adding the current instruction into a runtime instruction list of a current device stream, and then adding the current device stream into an active device stream list;

S532: preparing the each instruction in the temporary list by the device stream, fetching a type of the current device stream according to metainformation of the device stream, judging whether the type of the current device stream is located on a current scheduler thread, in response to that the type of the current device is located on the current scheduler thread, running the current instruction according to the type of the current device stream, or adding the current instruction into a preparation instruction list corresponding to the current device stream, and then running an instruction in the preparation instruction list on a separate thread;

S533: running the each instruction in the temporary list by the device stream, receiving the current instruction by a computing function of the type of the device stream, setting a device ID according to a device ID of the device stream of the current instruction, calling a computing function of the each instruction in the temporary list according to the metainformation of the each instruction in the temporary list, and after the current instruction is executed, setting a state of the current instruction to be a "completed state"; and S534: pre-scheduling the each instruction in the temporary list: firstly, placing the preparation instruction list into the temporary list, continuously carrying out scheduling on the temporary list, after the temporary list receives the each instruction in the preparation list, directly executing the each instruction in the temporary list by the virtual machine, and at the same time, in a working process, once an instruction capable of being pre-scheduled is found, adding the instruction capable of being pre-scheduled into the preparation list.

8. The method of executing dynamic graph for neural network computation according to claim 7, wherein the step S533 of calling the computing function of the instruction according to the metainformation of the instruction includes the following specific process:

(1) acquiring device context information;

(2) acquiring a current operand;

(3) according to the device context information and the operand, allocating a memory to the output tensor, and allocating a memory to a temporary tensor;

(4) according to the device context information and the operand, initializing a state and a cache of the kernel function of the current operator; and (5) according to the device context information, the operand, and the state and the cache of the kernel function of the current operator, carrying out computation by the kernel function of the current operator.

9. The method of executing dynamic graph for neural network computation according to claim 1, wherein the step S6 includes the following specific processes:

S61: traversing a current active device stream list, calling a query interface of the type of the device stream to query the state of the current instruction, judging whether each instruction in a runtime instruction list of each device stream is in a "completed state", and in response to that each instruction in the runtime instruction list of each device stream is in the "completed state", releasing the current instruction; and S62: deleting the current instruction from the runtime instruction list of the current device stream.

10. An apparatus of executing dynamic graph for neural network computation, comprising a non-transitory memory and one or more processors, wherein an executable code is stored in the non-transitory memory, and, the one or more processors, when executing the executable code, are configured to implement the dynamic graph executing method for neural network computation according to claim 1.

* * * * *